US010733486B1

(12) United States Patent
Bigbee, Jr. et al.

(10) Patent No.: US 10,733,486 B1
(45) Date of Patent: Aug. 4, 2020

(54) APPARATUS FOR CONTROLLING THE PRINTING ON CABLE

(71) Applicant: Encore Wire Corporation, McKinney, TX (US)

(72) Inventors: William T. Bigbee, Jr., Melissa, TX (US); Clifton S. Thompson, Lucas, TX (US); Ferrin E. Gomez, Van Alstyne, TX (US); Tony Ornelas, III, Frisco, TX (US)

(73) Assignee: Encore Wire Corporation, McKinney, TX (US)

( * ) Notice: Subject to any disclaimer, the term of this patent is extended or adjusted under 35 U.S.C. 154(b) by 0 days.

(21) Appl. No.: 16/363,990

(22) Filed: Mar. 25, 2019

Related U.S. Application Data

(63) Continuation of application No. 15/394,533, filed on Dec. 29, 2016, now Pat. No. 10,296,818.

(60) Provisional application No. 62/273,963, filed on Dec. 31, 2015.

(51) Int. Cl.
| | |
|---|---|
| *G06F 3/12* | (2006.01) |
| *G06K 15/02* | (2006.01) |
| *G01G 17/02* | (2006.01) |
| *G01B 11/06* | (2006.01) |
| *H01B 13/34* | (2006.01) |
| *G06K 15/10* | (2006.01) |
| *H04N 1/44* | (2006.01) |
| *H04N 1/00* | (2006.01) |

(52) U.S. Cl.
CPC ............ *G06K 15/021* (2013.01); *G01B 11/06* (2013.01); *G01G 17/02* (2013.01); *G06K 15/10* (2013.01); *H01B 13/345* (2013.01); *H04N 1/00315* (2013.01); *H04N 1/00384* (2013.01); *H04N 1/00411* (2013.01); *H04N 1/4426* (2013.01)

(58) Field of Classification Search
None
See application file for complete search history.

(56) References Cited

U.S. PATENT DOCUMENTS

| | | | | |
|---|---|---|---|---|
| 5,237,917 | A * | 8/1993 | Traut | H01B 13/345 101/35 |
| 9,305,683 | B1 * | 4/2016 | Bigbee, Jr. | B41J 3/4073 |
| 2007/0245255 | A1 * | 10/2007 | Galgano | G06F 30/00 715/764 |
| 2010/0191603 | A1 * | 7/2010 | Herwig | G06Q 20/18 705/14.65 |
| 2013/0240242 | A1 * | 9/2013 | Simpson | H01B 13/14 174/116 |
| 2014/0048607 | A1 * | 2/2014 | Holcombe | G06K 19/06009 235/494 |

(Continued)

*Primary Examiner* — Andrew H Lam
(74) *Attorney, Agent, or Firm* — Warren Rhoades LLP

(57) ABSTRACT

An apparatus for controlling the printing on wire or cable. The apparatus including a processor, a bus connected to the processor, a user input connected to the bus, a display screen connected to the user input and the bus, a first storage system connected to the bus, data stored in the first storage system and displayable on the display screen, wherein the data includes manufacturing and print information, a printer connected to the bus, wherein the printer prints the data on the wire or cable, a communication device connected to the bus, and an identification device connected to the bus, wherein identification device receives information from a user.

20 Claims, 3 Drawing Sheets

(56) References Cited

U.S. PATENT DOCUMENTS

2015/0156342 A1\* 6/2015 Fries ................. H04N 1/00411
                                                                        358/1.15
2016/0375436 A1\* 12/2016 Cheng ................... G01N 33/02
                                                                        506/39

\* cited by examiner

APPARATUS FOR CONTROLLING THE PRINTING ON CABLE

CROSS-REFERENCE TO RELATED APPLICATIONS

This application is a continuation of Ser. No. 15/394,533, filed Dec. 29, 2016, which claims priority benefit to U.S. Provisional Patent Application No. 62/273,963, filed Dec. 31, 2015, both of which are fully incorporated by reference herein.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The present invention relates in general to electrical wire or cable, and more particularly, to the systems and apparatus for the manufacture and application of specification information on electrical wire or cable.

2. Description of Related Art

Wire or cable products are typically manufactured and delivered on spools, reels or packages. To assist the operator in identifying the specific wire or cable, wire or cable products typically have a variety of specifications that are printed along the length of the product in the form of a "print legend." The print legend contains information about the product such as the size, product type, temperature rating, safety certifications, manufacturing line or personnel, date and time of manufacture, and other product ratings denoting flame resistance, chemical resistance, etc. One prior art method includes the use of ink-jet print technology to print the desired text on the product composed of dot-matrix lettering.

A wire or cable manufacturing line is capable of producing several different configurations of products. The operator must have available information required to configure the manufacturing line for each product type. For example, on an insulation extrusion line, this information may include conductor, insulation, and jacket thicknesses, compound specifications, equipment temperature settings, line speeds, tooling sizes, sparker voltages, etc. Typically, a master document is available that includes all this required information in addition to a specification of the print legend for the project. Typically, this document is contained within a binder near the manufacturing line.

After the product is manufactured, the machine operator will measure the critical dimensions of the product, including thicknesses and weights. Typically, the operator notes these measurements on a document which may be collected for accounting or quality control analysis or review.

This prior art method has several disadvantages. First, the operator must read the print legend from the master document and manually type the text into a computerized ink jet printer system. It is common for errors to be made in the process of manually typing the print legend and product may be scrapped or wasted due to the bad print caused by manual entry of the information. Next, the typing of the print represents operator time, time that is not spent manufacturing wire or cable products. The operator is also free to manipulate the print so that any unauthorized change could be made, and the operator could prevent his name from appearing on the record in order to avoid fault for incorrectly manufactured product. As the master document is updated, new hardcopies of the master document must be prepared and distributed to each manufacturing line. Significant changes require the excesses use of resources such as paper, ink and time. Reported measurements must be manually entered into a computer database by a second worker after the operator noted the results at the manufacturing line. Finally, the current method incurs substantial storage costs One prior art method to overcome some of these disadvantages included automating the current paper-based system to include a barcode on documents for the master document. The barcode is associated with the information needed to provide the information on the wire or cable product. This method, however, fails to alleviate many of the disadvantages discussed herein.

BRIEF SUMMARY OF THE INVENTION

The present invention provides for a multi-function kiosk to control, print and record the vital information associated with the manufacture and delivery of wire or cable products. The multi-function kiosk is in communication with the cable or wire production line and may also be in communication, wirelessly or hard-wired, with a home computer network. The kiosk includes a computer system with a processor, a bus, a user input, a display screen, a storage system, data stored in the storage system and displayable on the display screen, a printer wherein the printer prints data on the wire or cable, a communication device, and an identification device wherein identification device receives information from a user. The multi-function kiosk stores the manufacturing and labeling or printing data or is in communication with the home network where this information is stored. The multi-function kiosk controls the manufacture of the wire or cable and further controls the printing of manufacturing data on the wire or cable. Additionally, the multi-function kiosk collects and stores vital quality control or measurement data from the finished wire or cable.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

DETAILED DESCRIPTION OF THE PREFERRED EMBODIMENT

The following discussion is presented to enable a person skilled in the art to make and use the present invention. The general principles described herein may be applied to embodiments and applications other than those specifically detailed below without departing from the spirit and scope of the present invention. Therefore, the present invention is not intended to be limited to the embodiments expressly shown, but is to be accorded the widest possible scope of invention consistent with the principles and features disclosed herein.

Figure 1:
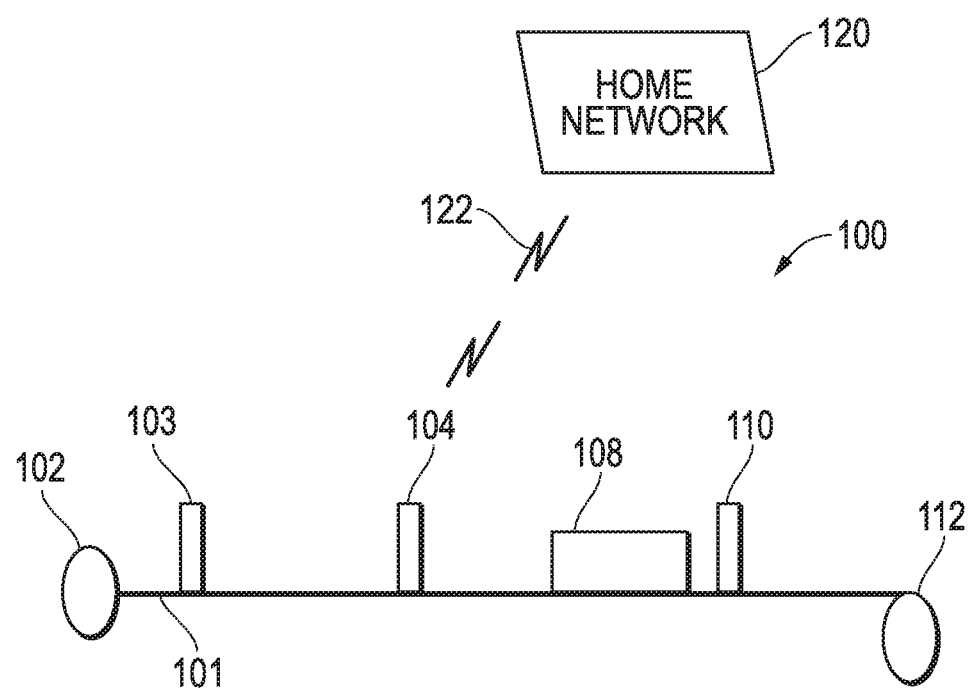
FIG. 1 depicts an overview of manufacturing line for wire or cable including a multi-function kiosk in accordance with one embodiment of the invention.

Referring to FIG. 1, a diagram is depicted that illustrates a system and apparatus of manufacturing wire or cable with the multi-function kiosk in accordance with one embodiment of the present invention. A wire or cable manufacturing line 100 is shown. In one embodiment, a standard payoff reel 102 to supply an internal conductor(s) 101, such as a copper or aluminum wire is provided in line 100. The standard payoff reel 102 supplies the internal conductor(s) 101 to an extruder 103 to apply at least an insulating material and an outer jacket over the internal conductor(s) 101. The extruder 103 may be a single extruder head, a plurality of extruders, a cross head, a co-extrusion head or any combination thereof. The insulating material may be thermoset, thermoplastic, elastomeric, polymeric dielectric, polyvinylchloride (PVC), or a semiconductor compound or any combination thereof. The outer jacket may be an additional insulating material or a composition of a different material.

A multi-function kiosk 104 is utilized in system 100 to control the manufacturing and labeling or printing of manufacturing data on the wire or cable. In one embodiment, the multi-function kiosk 104 is a stand-alone computer system. In another embodiment, the multi-function kiosk 104 communicates 122 with a home network 120. The communication 122 may occur over a hard-wired communication line or wirelessly. In another embodiment, the multi-function kiosk 104 communicates with the extruder 103 and other devices on the manufacturing line 100, supplying manufacturing specifications to those devices, the manufacturing specifications including, but not limited to, conductor type, insulation, and jacket thicknesses, compound specifications, equipment temperature settings, line speeds, tooling sizes, and sparker voltages. After the insulating material and the outer jacket are applied, the wire or cable is supplied to a cooling device 108 for cooling the applied insulating material over the wire or cable. In one embodiment, the cooling device 108 may be a water trough or similar device that contains a cooling material. The cooling device 108 functions to cool and lower the temperature of the insulating material over the wire or cable as it departs extruder 103 and enters the cooling device 108 by removing latent heat caused by extrusion in extruder 103. The cooling of insulating material provides a more stable polymeric state for later processing. In one embodiment, the insulating material is cooled to an ambient temperature, such as a temperature of less than 85 degrees Celsius.

After the extrusion process, a printer 110 prints wire or cable specification information on the wire or cable. The wire or cable specification information are printed along the length of the product in the form of a "print legend." In one embodiment, the print legend contains information about the product such as the size, product type, temperature rating, safety certifications, manufacturing line or personnel, date and time of manufacture, and other product ratings denoting flame resistance, chemical resistance, etc. The printer 110 receives this wire or cable specification information from the multi-function kiosk 104. The printer 110 may be a component of the multi-function kiosk 104, hard wired to the multi-function kiosk 104 or may communication wirelessly with the multi-function kiosk 104. Once the wire or cable specification information is printed on the wire or cable, a motor-driven reel 112 is provided to wind up the resulting wire or cable. The resulting wire or cable is reeled by the motor-driven reel 112 and wrapped in plastic film for distribution or storage.

Figure 2:
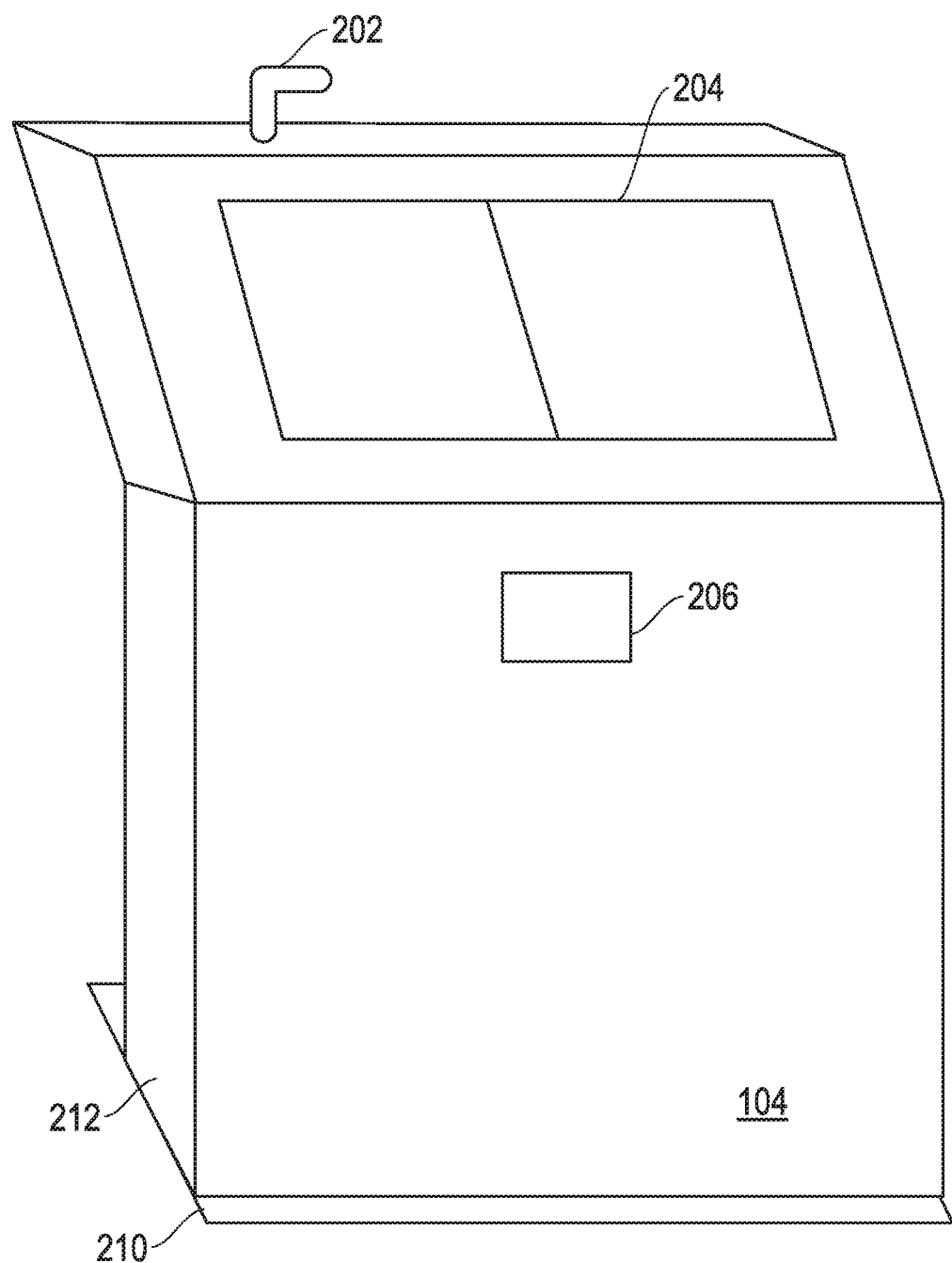
FIG. 2 is a perspective view of a multi-function kiosk according to one embodiment of the invention.

Referring now to FIG. 2, a multi-function kiosk is shown. The multi-function kiosk 104 is a computer system to store and manage the manufacturing information necessary to produce and label or print the manufacturing specifications on wire or cable. The multi-function kiosk includes a base 210 and a framed body 212. In one embodiment, the base 210 and framed body 212 are formed from metal and are securely attached to the ground through the use of bolts. A wide variety of bases 210 and framed bodies 212 may be implemented without detracting from the spirit of the invention. The multi-function kiosk communicates with external equipment, such as the extruder 103, printer 110 or home network 120, either through hard wires or wirelessly. The multi-function kiosk 104 includes an antenna(s) 202 which may be located at the top of the multi-function kiosk 104 or located internally. The antenna 202 may receive and transmit information to and from external devices such as the home network 120, including data related to the master document for the printers on the insulation line. A screen 204 of the multi-function kiosk is provided below the antenna 202. In one embodiment the screen 204 is touch-sensitive, however a wide variety of screens may be implemented without detracting from the spirit of the invention. A card sensor 206 is provided below the screen. In one embodiment, a smart card is provided to each operator and the smart card must be used to activate the multi-function kiosk 104. In this embodiment, the smart card contains the information needed to identify the operator and is used to authorize certain actions executed by the multi-function kiosk 104. In one embodiment, each manufacturing line is provided with a multi-function kiosk 104.

In one embodiment, the multi-function kiosk 104 accesses wire or cable production manufacturing data in the form of computer files for viewing in a read-only mode. In this embodiment, the multi-function kiosk 104 user cannot modify manufacturing data. Such mode protects the integrity of the wire or cable production manufacturing data from being corrupted, either purposefully or accidentally. In this mode, the data may be accessed from a home network 120 data storage system or an internal storage system. Using the home network 120 storage system allows for a modification to only be made a single time at the home network 120, such modifications may then be propagated to all multi-function kiosks 104 to update the data. Access to the data contained in the home network 120 may be required to print the print legend for a product in a specified format.

The multi-function kiosk 104 is connected to the printer 110. In one embodiment, the printer 110 is a computerized ink jet printer or a laser printer. The multi-function kiosk 104 provides manufacturing or configuration data to the printer 110 so the printed text contains the data when an authorized user desires to print on the wire or cable products.

In one embodiment, the multi-function kiosk 104 screen 204 is separated in to two sections: left and right. The area on the left of the screen 204 may contain a contrasting background and may disclose technical operating instructions (TOI). TOIs include the manufacturing and labeling or printing information which may be stored in the multi-function kiosk 104 or the home network 120. In prior art methods, the TOI were stored in paper form and updated versions of the TOIs were hand delivered to each production line any time a modification to the TOI's were made by the user. In this embodiment, a column of buttons on the left edge of the screen 204 is provided. The buttons allow for multiple operators, such as "Operator 1 Login/Logout", "Operator 2 Login/Logout", "Operator 3 Login/Logout", "Operator 4 Login/Logout", and "Operator 5 Login/Logout." Additionally, quality control or print command buttons are provided, such as "Quality Control" and "Send to Printer." Buttons regarding the manipulation of the TOIs are also provided, such as "Load new TOI" and "Show Last TOI Sent to Printer." Text provided on the screen 204 may display the location of the TOI file currently being used and a copy of the text that is currently being sent to the printer for printing on the product. Finally, the right side of the screen 204 may provide a log of events occurring during the use of the multi-function kiosk 104, such as operator log-ins or logouts and TOI changes.

In one embodiment, multiple users may use the multi-function kiosk 104, such as five operators may log in to the multi-function kiosk 104. In one embodiment, the operator must first press the login button, and then place his smart card next to the card sensor 206. The multi-function kiosk 104 verifies the operator's identity. When an operator or user is logged in, the multi-function kiosk 104 appends the operator's employee ID number to the print legend of the product. While operators or users have the authority to load and view TOI files, they may not have authority to send the print legend information to the printer 110. In this instance, a quality control inspector or other authorized user must be present to send text to the printer 110. In this embodiment, a qualified user must press the "Quality Control" button and then swipe his or her smart card over the card sensor 206 to initiate a print. Once the identity is verified, the user may successfully use the "Send to Printer" function, after which they are immediately logged out from the multi-function kiosk 104.

In one embodiment of the invention, the multi-function kiosk 104 stores a log of all the events and product changes that occur using the multi-function kiosk 104. The activity log is both visible on the screen 204 of the multi-function kiosk as well as saved to a file that can be accessed through the company's home network 120.

In one embodiment of the invention, the multi-function kiosk 104 includes a system for accepting the data collected during hourly product measurements executed by the operator. The operator may make thickness or diameter measurements with calipers, micrometers, pin gauges (a.k.a. dial indicators) and enter the data into the multi-function kiosk 104. The operator may also weigh the product components at a standardized length and enter the weight data into the multi-function kiosk 104. Measurement tools with built-in wireless capabilities may be implemented, however, a wide variety of tools may be implemented without detracting from the spirit of the invention. Through the use of measurement tools with wireless capability, operator time is reduced and accuracy of the data submitted to the multi-function kiosk 104 is increased. The multi-function kiosk 104 may interface with a laser micrometer diameter measurement system for purposes of data logging real-time product measurements. Additionally, the multi-function kiosk 104 may incorporate a listing of the schedule for products to be manufactured on the line.

Figure 3:
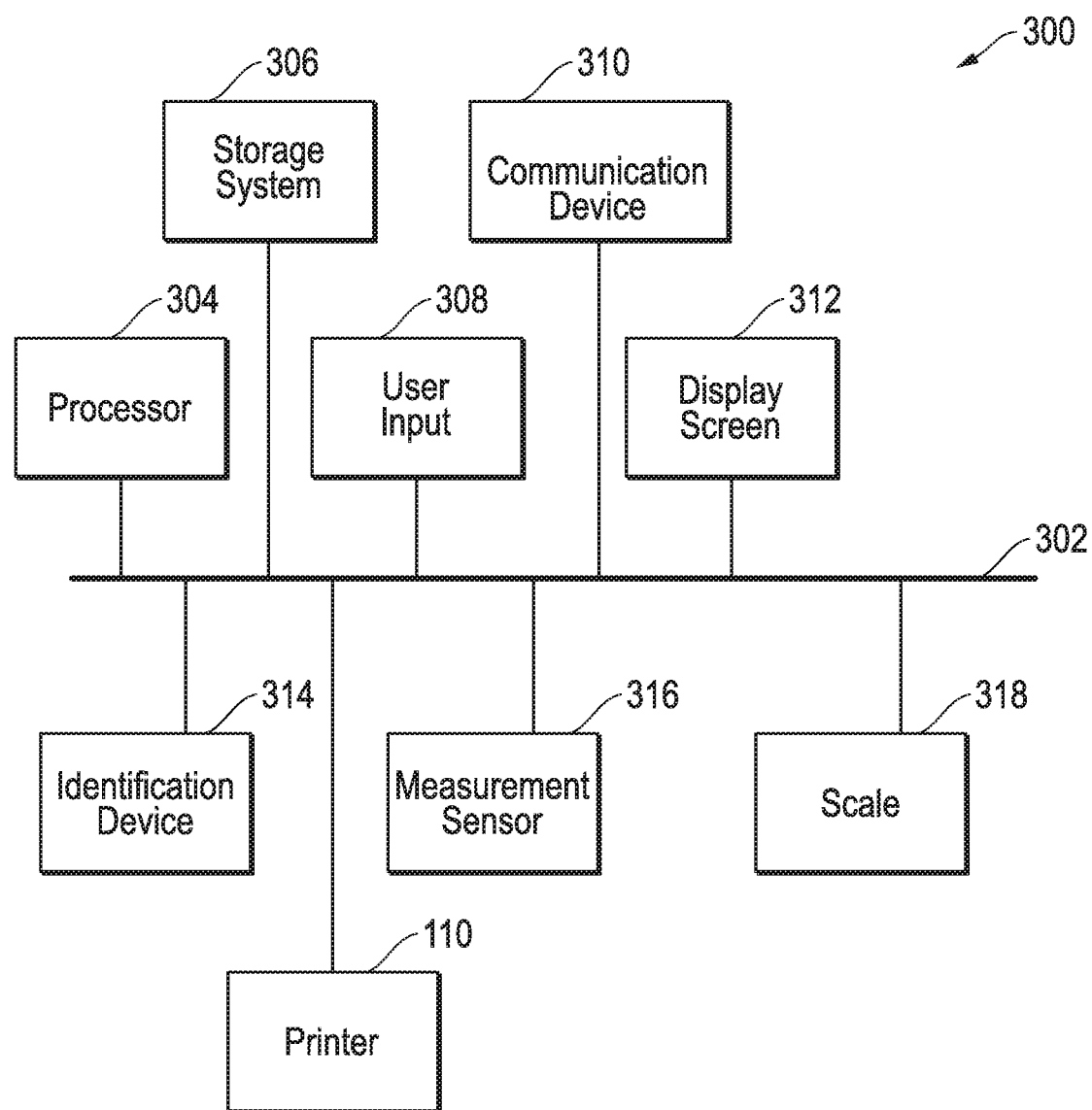
FIG. 3 is a block diagram of the computer system of the multi-function kiosk according to one embodiment of the invention.

Referring now to FIG. 3, the computer system 300 of the multi-function kiosk 104 according to one embodiment of the invention is shown. A communication bus 302 is provided. The bus 302 functions to receive and transmit information between the components of the computer system that are interconnected through the bus 302. A processor 304 is connected to the bus. The processor 304 is of the type commonly available to one skilled in the art. A storage system 306 is connected to the bus 302. The storage system 306 includes both long term storage, such as a hard disk drive or optical disk drive, and short term storage such as RAM. Data may be stored in the storage system 306. The data may include manufacturing and labeling or printing information such as information about the wire or cable product such as the size, product type, temperature rating, safety certifications, manufacturing line or personnel, date and time of manufacture, and other product ratings denoting flame resistance, and chemical resistance. Further, the manufacturing data may include, but is not limited to, conductor type, insulation, and jacket thicknesses, compound specifications, equipment temperature settings, line speeds, tooling sizes, and sparker voltages. This manufacturing data may be stored in the storage system 306 and/or stored in the home network 120 storage system. Additionally, TOIs, operator or user information, and quality control requirements may be stored, either in the long or short term, in the storage system 306. The storage system 306 may receive or transmit information wirelessly through the computer system to another computer system such as the home network 120. A home network 120 storage system may be implemented with the kiosk 104 and storage system 306. The home network 120 storage system may be implemented to store all of the data necessary for the manufacturing and labeling or printing of the information on the wire or cable. The home network 120 storage system may also store all data that is capable of being stored in the storage system 306, including without limitation, user information and measurement or quality control information. Information may be transmitted between the storage system 306 and the home network 120 storage system wirelessly or through a hard-wired communication system.

A user input 308 is connected to the bus 302 of the computer system 300. The user input 308 allows the user to enter information into the computer system 300. The user input 308 may be a touch computer screen or may be a keyboard or mouse. A wide variety of input devices may be implemented without detracting from the spirit of the invention. A communication device 310 is connected to the bus. The communication device 310 facilitates communication from the computer system 300 to external devices or computer systems. The communication device 310 may be an internet/telephonic connection, a hard-wired connection, or a wireless connection. A wide variety of communication devices may be implemented without detracting from the spirit of the invention. The communication device 310 transmits information to and from external devices such as the extruder 103, the external printer 110, or the home network 120. A display screen 312 is connected to the bus 302. The display screen 312 displays information for viewing by the operator or user. In one embodiment, the display screen 312 also allows user input of information such as through touch-screen technology.

The computer system 300 includes an identification device 314. The identification device 314 accepts information from the user and transmits this information to the remaining components of the computer system 300. In one embodiment, the identification device 314 is a card reader or a smart card reader. In other embodiments, the identification device 314 is a fob, numeric or alpha-numeric keypad, or biometric sensor. The information read by the identification device 314 may include the identity of the user, information concerning the level of access or authorization of the user, the ability to modify information, and the ability to request the printing of manufacturing data on the wire or cable. The information read by the identification device 314 may be compared by the processor 304 with information stored in the storage system 306 to determine if actions requested by the user, such as printing, are allowable by the computer system 300. In another embodiment, the information read by the identification device 314 may be compared by the processor 304 with information stored in the storage system of an external computer system such as the home network 120. Additionally, the user information read by the identification device 314 may be appended to the printing data to the user data appears on the printed wire or cable. In another embodiment, no activity is allowed on the multi-function kiosk 104 without authorization for information received by the identification device 314. The user information read by the identification device may be stored in the storage system as a log file which will detail the user and ever action requested or performed by the multi-function kiosk 104 while the user is logged in to the computer system 300.

A printer 110, a measurement sensor 316, and a scale 318 are connected to the computer system 300. The printer 110, measurement sensor 316, and the scale 318 may each be independently connected to the bus 302 or each may be connected to the computer system wirelessly, or any combination thereof. External devices communicate with the multi-function kiosk 104 through the communication device 310 which further communicates with all other components of the computer system 300 over the bus 302. The printer 110 prints the manufacturing data on the manufactured wire or cable. The measurement sensor 316 measures the manufactured wire or cable and transmits this information to the display 204, the storage system 306, the storage system of the home network 120 or any combination thereof. Once transmitted, the storage system 306, or the storage system of the home network 120, stores the measurement sensor data for future review and analysis and the display 204 displays the measurement sensor data to the user for review and analysis. Sensor measurement data may include the thickness of the wire or cable, the thickness of the insulation, the consistency of the thickness of the wire or cable throughout the cable length, or other analytics. A wide variety of sensor measurement data may be determined without detracting from the spirit of the invention. In one embodiment, the measurement sensor 316 is a laser micrometer. The scale 318 measures the weight of the wire or cable and transmits this information to the display 204, the storage system 306, the storage system of the home network 120 or any combination thereof. Once transmitted, the storage system 306, or the storage system of the home network 120, stores the measured weight of the wire or cable for future review and analysis and the display 204 displays the measured weight to the user for review and analysis.

Although the invention is described herein with reference to specific embodiments, various modifications and changes can be made without departing from the scope of the invention as set forth in the claims below. Accordingly, the specification and figures are to be regarded in an illustrative rather than a restrictive sense, and all such modifications are intended to be included within the scope of the invention. Any benefits, advantages, or solutions to problems that are described herein with regard to specific embodiments are not intended to be construed as a critical, required, or essential feature or element of any or all the claims. Additionally, the combination of embodiments is intended unless the combinations are mutually exclusive. It will become apparent to one skilled in the art that multiple embodiments may be combined without detracting from the spirit of the invention.

From time-to-time, the invention is described herein in terms of these example embodiments. Description in terms of these embodiments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The preceding discussion is presented to enable a person skilled in the art to make and use the invention. The general principles described herein may be applied to embodiments and applications other than those detailed below without departing from the spirit and scope of the invention as defined by the appended claims. The invention is not intended to be limited to the embodiments shown, but is to be accorded the widest scope consistent with the principles and features disclosed herein.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

The various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more", "at least", "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Unless stated otherwise, terms such as "first" and "second" are used to arbitrarily distinguish between the elements such terms describe. Thus, these terms are not necessarily intended to indicate temporal or other prioritization of such elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the field or any related fields are intended to be within the scope of the following claims.

The invention claimed is:

1. An apparatus for controlling the printing on wire or cable, the apparatus comprising:
a first storage system;
data stored in the first storage system and displayable on a display screen, wherein the data includes manufacturing and print information;
an identification device connected to the first storage system, wherein identification device receives user identification information from a user; and
an authentication system connected to the identification system and the first storage system, wherein the authentication system compares the user identification information received by the identification device with the manufacturing and print data in the first storage device; and
a printer connected to the authentication system, wherein the authentication system communicates authority to the printer to print manufacturing data and wherein the printer prints the data on the wire or cable.

2. The apparatus of claim 1, wherein the identification device is a card reader.

3. The apparatus of claim 1, wherein the identification device is a biometric sensor.

4. The apparatus of claim 1, wherein the user identification information is stored in the first storage system.

5. The apparatus of claim 1, further comprising a second storage system in wireless communication with a wireless communication device and the authentication system, wherein the second storage system includes manufacturing and printing data.

6. The apparatus of claim 5, wherein the manufacturing and printing data from the second storage system is wireless transmitted to the authentication system.

7. The apparatus of claim 5, wherein the user identification information is stored in the second storage system.

8. The apparatus of claim 1, wherein the print data includes the user information.

9. The apparatus of claim 1, wherein the data and information received is stored in a log file in the first storage system.

10. The apparatus of claim 1 further comprising:
a sensor connected to the first storage system, the sensor measuring the wire or cable;
sensor data collected by the sensor, the sensor data stored in the first storage system.

11. The apparatus of claim 10, wherein the sensor measures the thickness of the wire or cable.

12. The apparatus of claim 10, wherein the sensor is a laser micrometer.

13. The apparatus of claim 1 further comprising:
a scale connected to the first storage system, the scale measuring the weight of the wire or cable; and
weight information collected by the scale, the weight information stored in the first storage system.

14. The apparatus of claim 1 further comprising:
a user input connected to the first storage system;
wherein user input data is entered through the user input.

15. The apparatus of claim 14, wherein the user input data received from the user includes information received from multiple users.

16. The apparatus of claim 14, wherein the user input data received from the user includes information modifying information stored in the first storage device.

17. The apparatus of claim 14, wherein the user input data received from the user includes requests for the printing of manufacturing data on the wire or cable.

18. The apparatus of claim 14, wherein the user input includes a touch screen.

19. The apparatus of claim 14, wherein the identification device includes a keyboard.

20. The apparatus of claim 1, wherein the printer is a dot matrix printer.

* * * * *